(12) United States Patent
Sako

(10) Patent No.: US 6,789,087 B1
(45) Date of Patent: Sep. 7, 2004

(54) INFORMATION PROCESSING APPARATUS FOR PROCESSING A PHOTOGRAPHED IMAGE OF A PERSON

(75) Inventor: Tsukasa Sako, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 09/611,268

(22) Filed: Jul. 6, 2000

(30) Foreign Application Priority Data

Jul. 6, 1999 (JP) .......................................... 11/192276

(51) Int. Cl.⁷ ............................................. G06F 17/30
(52) U.S. Cl. .......................... 707/104; 707/101; 707/5; 707/6
(58) Field of Search ............................ 700/90; 707/104, 707/100, 101, 5, 6; 250/370.09; 235/462.02, 472.01; 378/98.8, 98.7

(56) References Cited

U.S. PATENT DOCUMENTS

| | | | | |
|---|---|---|---|---|
| 4,762,410 A | * | 8/1988 | Sekiguchi et al. | 351/206 |
| 5,195,123 A | * | 3/1993 | Clement | 378/166 |
| 5,335,072 A | * | 8/1994 | Tanaka et al. | 348/231.3 |
| 5,374,967 A | * | 12/1994 | Hideshima et al. | 351/208 |
| 5,557,688 A | * | 9/1996 | Nakamura | 382/164 |
| 5,740,428 A | * | 4/1998 | Mortimore et al. | 707/104.1 |
| 5,832,488 A | * | 11/1998 | Eberhardt | 707/10 |
| 5,914,475 A | * | 6/1999 | Kimura et al. | 235/462.01 |
| 5,950,207 A | * | 9/1999 | Mortimore et al. | 707/104.1 |
| 5,999,697 A | * | 12/1999 | Murase et al. | 386/101 |
| 6,022,315 A | * | 2/2000 | Iliff | 600/300 |
| 6,074,064 A | * | 6/2000 | Viitasalo | 351/237 |
| 6,105,870 A | * | 8/2000 | Kimura et al. | 235/462.02 |
| 6,159,443 A | * | 12/2000 | Hallahan | 424/1.17 |
| 6,226,071 B1 | * | 5/2001 | Ishii et al. | 355/40 |
| 6,348,940 B1 | * | 2/2002 | Sano et al. | 347/247 |
| 6,415,108 B1 | * | 7/2002 | Kamishima et al. | 396/312 |
| 6,421,470 B1 | * | 7/2002 | Nozaki et al. | 382/321 |
| 6,433,341 B1 | * | 8/2002 | Shoji | 250/370.09 |
| 6,482,156 B2 | * | 11/2002 | Iliff | 600/300 |
| 6,483,993 B1 | * | 11/2002 | Misumi et al. | 396/78 |

FOREIGN PATENT DOCUMENTS

JP  8-160557  6/1996  ........... G03B/42/02

* cited by examiner

Primary Examiner—Jean M. Corrielus
(74) Attorney, Agent, or Firm—Fitzpatrick, Cella, Harper & Scinto

(57) ABSTRACT

When radiography or other photography is executed on a mass basis, by use of an information processing apparatus that processes a photographed images as digital image signals, identification information for identifying an examining location (e.g., a particular company), etc., is inputted. A database in which information regarding one or more examinees is stored, is selected, identification information that identifies the current examinee is inputted, and corresponding information is obtained from the database. A series of numbers for identifying photographing is generated for every examinee, and the examinee is photographed. The obtained image information is stored in a nonvolatile storing unit together with a series of numbers and the examinee information.

9 Claims, 12 Drawing Sheets

IMAGE PROCESS, IRRADIATING FIELD APERTURE MECHANISM

POSITION OF PHOTOTIMER

CHARACTERISTIC QUANTITY REGION

| Weight / Height | LESS THAN 10kg | 10 OR MORE LESS THAN 30kg | 30-50kg | 30-50kg | 50-70kg | 80-100kg | 100 OR MORE |
|---|---|---|---|---|---|---|---|
| LESS THAN 70cm | (80, 14) (18, 31) | (80, 14) (18, 31) | N/A | N/A | N/A | N/A | N/A |
| 70 OR MORE LESS THAN 90 | (80, 14) (18, 31) | (80, 19) (18, 31) | (80, 24) (18, 31) | N/A | N/A | N/A | N/A |
| 90-110 | (80, 24) (18, 31) | (80, 29) (18, 31) | (80, 31) (18, 31) | (80, 36) (18, 31) | N/A | N/A | N/A |
| 110-130 | (80, 30) (22, 37) | (80, 34) (22, 37) | (80, 39) (22, 37) | (81, 44) (22, 37) | (81, 49) (22, 37) | (81, 54) (22, 37) | N/A |
| 130-150 | N/A | (80, 42) (22, 37) | (93, 47) (27, 43) | (95, 52) (27, 43) | (95, 57) (27, 43) | (95, 62) (27, 43) | (95, 67) (27, 43) |
| 150-170 | N/A | N/A | (106, 55) (30, 50) | (108, 60) (30, 50) | (108, 65) (30, 50) | (108, 70) (30, 50) | (108, 75) (30, 50) |
| 170-190 | N/A | N/A | N/A | (121, 68) (34, 56) | (121, 73) (34, 56) | (121, 78) (34, 56) | (121, 83) (34, 56) |
| 190~ | N/A | N/A | N/A | N/A | (135, 81) (37, 62) | (135, 86) (37, 62) | (135, 91) (37, 62) |

UNIT mm

LOCATION OF CHARACTERISTIC QUANTITY REGION
GIVEN AS (L, D)
(W, H)
(CHEST PA RADIOGRAPHY)

CHARACTERISTIC QUANTITY REGION

90kg, 170cm
→
(L, D) = (121, 78)
(W, H) = (34, 56)

50kg, 170cm
→
(L, D) = (121, 73)
(W, H) = (34, 56)

9kg, 55cm
→
(L, D) = (80, 14)
(W, H) = (18, 31)

CHARACTERISTIC QUANTITY REGION EXAMPLE
(CHEST PA RADIOGRAPHY)

| Weight<br>Height | LESS THAN 10kg | 10 OR MORE LESS THAN 30kg | 30-50kg | 30-50kg | 50-70kg | 80-100kg |
|---|---|---|---|---|---|---|
| LESS THAN 70cm | (28, 33) | (30, 35) | N/A | N/A | N/A | N/A |
| 70 OR MORE LESS THAN 90 | (30, 35) | (33, 38) | (30, 35) | N/A | N/A | N/A |
| 90-110 | (33, 40) | (35, 40) | (33, 38) | (38, 40) | N/A | N/A |
| 110-130 | (33, 43) | (35, 43) | (35, 40) | (38, 43) | (38, 43) | (43, 43) |
| 130-150 | N/A | N/A | (35, 43) | (35, 43) | (38, 43) | (43, 43) |
| 150-170 | N/A | N/A | (35, 43) | (35, 43) | (35, 43) | (38, 43) |
| 170-190 | N/A | N/A | N/A | (35, 43) | (35, 43) | (38, 43) |
| 190~ | N/A | N/A | N/A | N/A | (35, 43) | (35, 43) |

UNIT mm

IRRADIATING FIELD APERTURE REGION, GIVEN AS (W, H)
(CHEST PA RADIOGRAPHY)

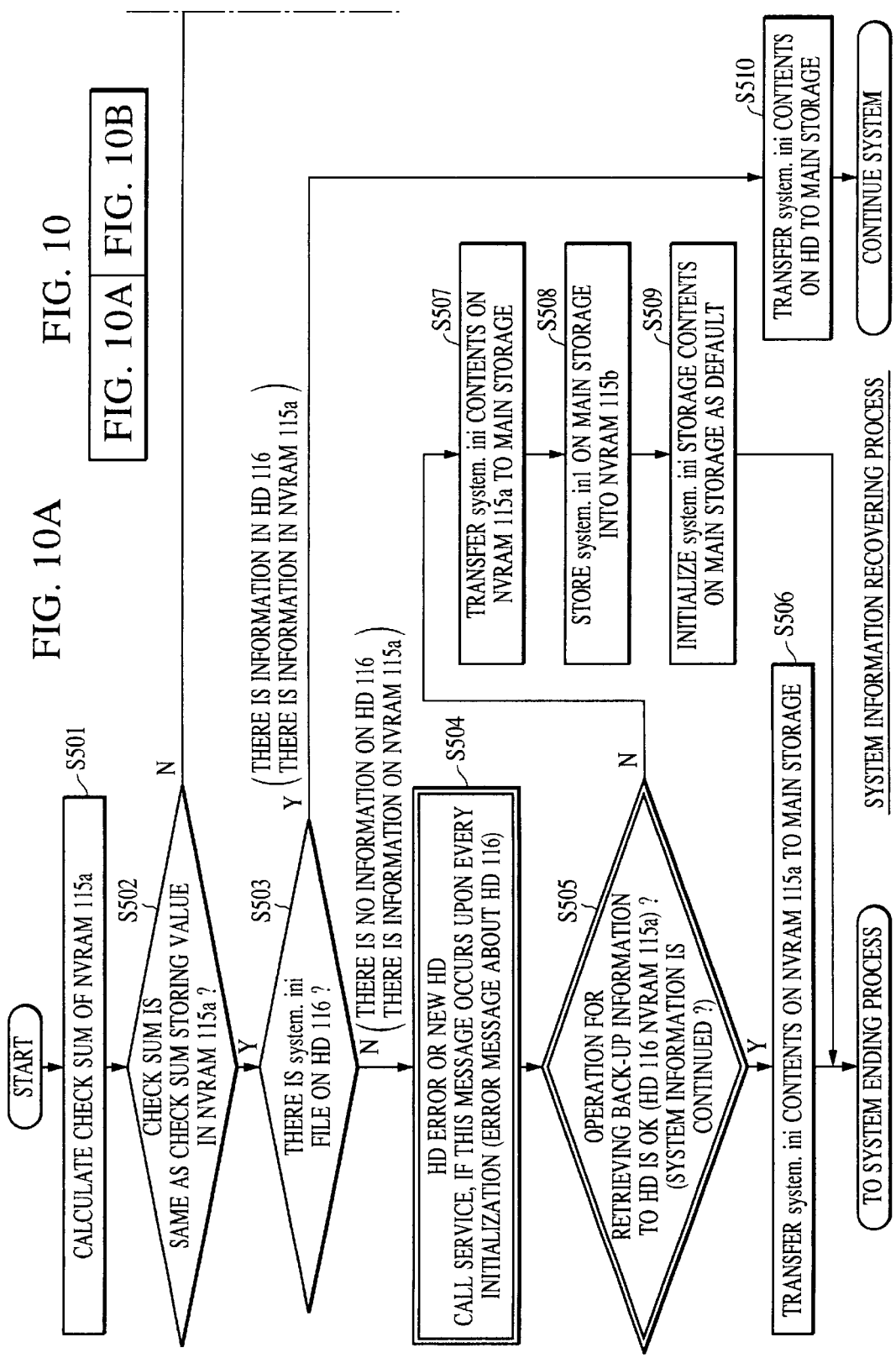

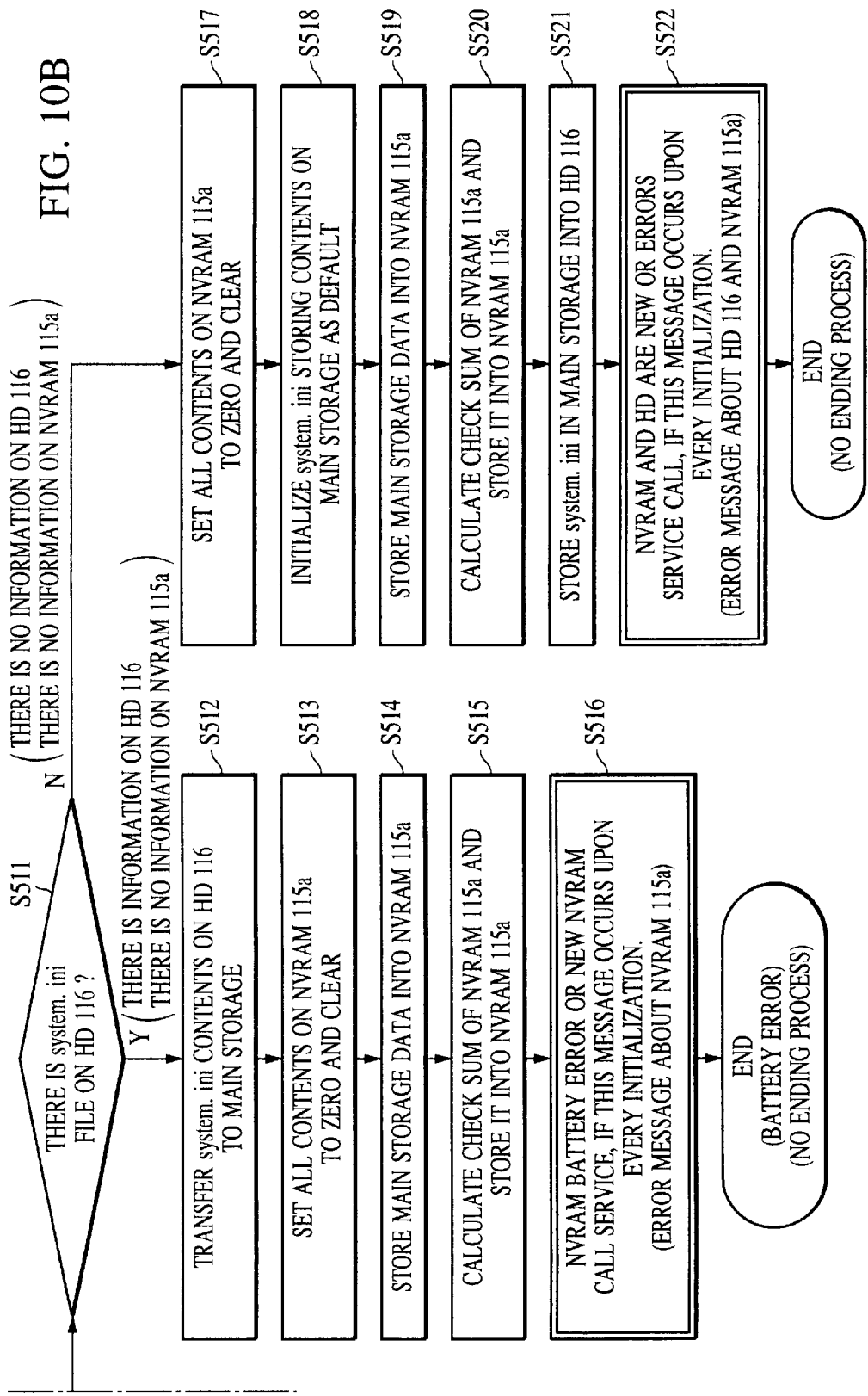

SYSTEM ENDING PROCESS

INFORMATION PROCESSING APPARATUS FOR PROCESSING A PHOTOGRAPHED IMAGE OF A PERSON

BACKGROUND OF THE INVENTION

1. Field of the Invention

The present invention relates to an information processing apparatus for executing a predetermined image processing on image information obtained, for example, by radiography, and storing the processed information.

2. Description of the Related Art

Radiography for medical diagnosis generally utilizes a film screen system which is constructed by combining an intensifying screen with an X-ray film. According to this system, an X-ray transmitted through a subject, i.e., an X-ray including information about the subject is converted into visible light proportional to the intensity of the X-ray, by means of the intensifying screen, and the X-ray film (referred to as a "film", hereinlater) is exposed to the light, thereby forming an X-ray image of the subject on the film.

Recently, an X-ray digital photographing apparatus has also been utilized. According to this X-ray digital photographing apparatus, an X-ray is converted into visible light proportional to the intensity of the X-ray by means of a fluorescent material, converted into an electric signal by use of a plane sensor comprising a plurality of pixels, and converted into a digital signal by an A/D (analog/digital) converter.

When the radiography is performed on a plurality of examinees in a mass examination service that uses the film screen system, characters indicative of an ID and the name of an examinee are printed on the upper right of the film, etc. Alternatively, a unique number for the examinee is printed on the film. Therefore, an engineer records the ID and name on the film or the unique number and examinee name onto an irradiation record, thereby identifying the film with the examinee. This method is disclosed as conventional art in Japanese Unexamined Patent Application Publication No. Hei-8 160557, for example.

In the mass examination service, in particular, an examination performed on a vehicle, such as a bus, provided with the X-ray digital photographing apparatus, the bus departs from an examining center, and the radiography is conducted, by travelling around to a plurality of companies and business offices without returning to the examining center.

However, with digital X-ray photographing apparatus, it is extremely inconvenient to employ the above-described unique number for image management as a post-processing step, as described above, because the X-ray image information of the subjects is digitized and managed. In a case of travelling around a large number of companies and subjecting their personnel to radiography, the number of the obtained photographed-data is very large, and consequently the technique of management using only the unique number corresponding to the data for each examinee causes labor to increase and the work also becomes complicated. This problem is not limited to radiography but also occurs in other photographing, for instance, photographing using visible light.

SUMMARY OF THE INVENTION

It is an object of the present invention to provide an information processing apparatus which removes the inconvenience discussed-above, and a control method for such processing.

It is another object of the present invention to provide an information processing apparatus and control method capable of managing even a large number of items of photographed image information efficiently and simply.

It is still another object of the present invention to provide an information processing apparatus and control method capable of managing photographed information obtained by a mass examination of a plurality of examinees in a plurality of different areas efficiently and simply.

It is a further object of the present invention to provide an image processing apparatus and control method capable of managing identification information which identifies the photographing of a plurality of examinees without overlap (duplication) of the identification information and recovering the identification information simply.

Other objects of the present invention will become apparent from the following description and the appended claims with reference to the accompanying drawings.

According to one example of the present invention, there is provided an apparatus for photographing a plurality of subjects to be photographed (target images, or examinees) radiographically, which are divided into a plurality of groups, and storing the obtained X-ray digital image information. Group ID information (group identification information) indicative of a group to which the target image belongs, is first read and inputted from a group ID storage medium, in which the group ID information is recorded. A database corresponding to the group identification information is selected from a collection of databases managed on the basis of the groups, and target-image ID information (target-image identification information) is read (e.g., from an examinee identify card) and input for storage. Information (target image information) corresponding to the target-image ID information is searched and extracted from the selected database, the target image is photographed by using the extracted information relating to that examinee, and the obtained image information is stored and recorded together with the target-image information corresponding to the obtained image information.

It is discriminated whether the information read from the ID storage medium is group-ID information or examinee-image ID information. Based on the discriminated result, the database is selected or the target image information is extracted.

The target-image ID information is read and photographed from the target-image ID storage medium once or a plurality of times. Thereafter, the group-ID information is read again from the group-ID storage medium. Accordingly, it is possible to select a different database. In other words, it is possible to repeat the process of selecting the database, extracting currently-needed target-image information from the selected database, and when it is time to examine the next subject, selecting a different (or the same) database again.

In the managed database, data recorded in the target-image ID storage medium is interpreted, and data (identification information) indicating an interpreting method for extracting only the target-image ID information is also managed. This data is used when reading and extracting the target-image ID information from the target-image ID storage medium, after selecting the proper database. Since it is assumed that an employee card or the like is used as the target-image ID storage medium if obtaining the target-image information from each database and the format is different, depending on the company, the foregoing can correspond thereto. In this case, when an error occurs (in a case of improper information due to use of the wrong person's employee card or the like) as a result of recognizing whether or not inputted information from the target-image ID storage medium is proper on the basis of the recognized information, the inputted information can be excluded as improper information.

If applying the above-mentioned construction to an X-ray digital photographing apparatus provided in an examining bus, before the bus departs from the examining center, a database for every group (scheduled company or business office, etc.) is stored in advance in the X-ray digital photographing apparatus. When arriving at a specified company, in order to select a database corresponding to the specified company, information regarding a database selecting card (group ID storage medium), which is prepared in the examining center, is read by a medium reading unit, and the database is selected. Thereafter, information from the examinee's card (target-image ID storage medium) is read by the medium reading unit, and information corresponding to the examinee is extracted from the database. Based on the extracted target image information, the radiography for the examinee is executed, and the obtained X-ray image information is stored together with the target image information of the examinee.

BRIEF DESCRIPTION OF THE DRAWINGS

FIGS. 10A and 10B, constituting FIG. 10, are a flowchart for explaining the recovery process.

DESCRIPTION OF THE PREFERRED EMBODIMENTS

Embodiments of the present invention will now be described, with reference to the drawings.

Figure 1:
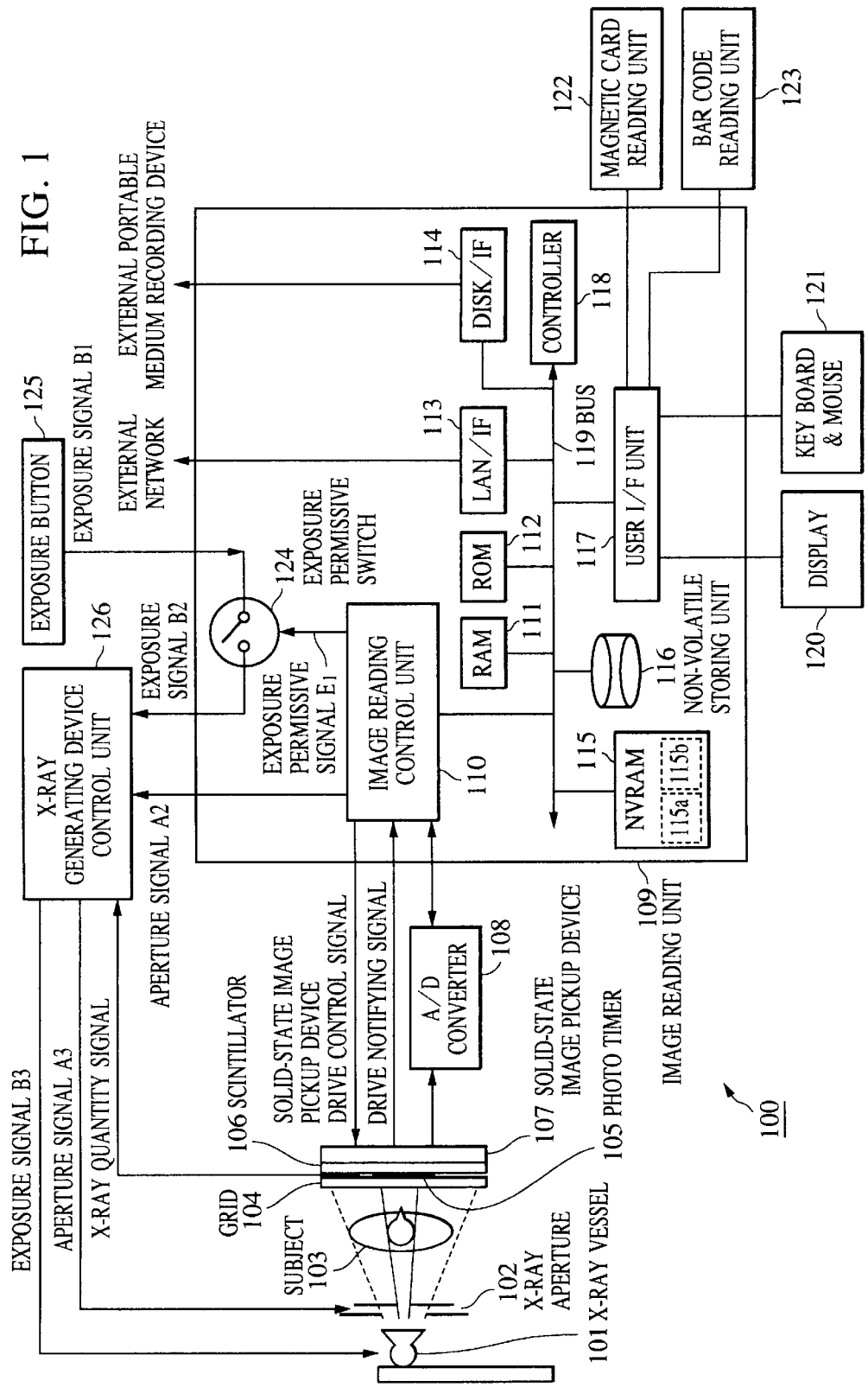
FIG. 1 is a block diagram showing the construction of an X-ray image photographing apparatus, to which the present invention is applied.

The present invention is applied to, for instance, an X-ray image photographing apparatus 100, as shown in FIG. 1.

The X-ray image photographing apparatus 100 comprises: an X-ray tube or other generator 101 for generating X-rays; an X-ray aperture 102 of the X-ray tube 101; a solid-state image pickup device 107 on which X-rays from the X-ray tube 101 are incident; a grid 104 and a scintillator 106 which are provided between the X-ray tube 101 and solid-state image pickup device 107; a phototimer 105 which is provided between the grid 104 and scintillator 106; an A/D converter 108 for outputting an output of the solid-state image pickup device 107 as a digital image signal; an image reading unit 109 for executing a predetermined processing on the digital image signal from the A/D converter 108 and producing an image that can be viewed on a display 120, etc.; and an X-ray generating device control unit 126 for controlling X-ray generation in the X-ray tube 101 under the control of (inter alia) an exposure button 125.

The image reading unit 109 comprises: an image reading control unit 110 for controlling the solid-state image pickup device 107 and the X-ray generating control unit 126, etc.; a RAM 111 used as a working area, in which a variety of items of data are stored; a ROM 112 for storing various processing programs, etc., which are executed in the present apparatus; a LAN/IF 113 as an interface unit to an external network (referred to as a "LAN", herein); a DISK/IF 114 as an interface unit to an external mobile medium recording device; an NVRAM 115 as a nonvolatile RAM; a nonvolatile storing unit 116, such as a hard disk; a user interface (I/F) unit 117; and a controller 118 for controlling the whole operation of the apparatus, such as executing the processing program stored in the ROM 112, which is connected thereto via a bus 119, thereby receiving/transmitting data from/to each other.

As mentioned, an exposure button 125 is provided for the image reading unit 109. An output of the exposure button 125 is supplied to the X-ray generating device control unit 126 via an exposure permissive switch 124, which is controlled by the image reading control unit 110.

Connected to the user I/F unit 117 are a display 120 such as a CRT, an operating unit 121 such as a key board and a mouse, a magnetic card reading unit 122, and a bar code reading unit 123.

[Series of operations in the X-ray image photographing apparatus 100]

To start with, the operator positions a photographing target image (referred to as a "subject", hereinafter) 103 between the solid-state image pickup device 107 and the X-ray tube 101.

Next, the operator prepares to take the photograph, utilizing the user interface 117.

After the operator finishes the preparation, the image reading control unit 110 applies a voltage to the solid-state image pickup device 107 as a solid-state image pickup device drive control signal, thereby placing the solid-state image pickup device in a state of standing by to pick up an image of the subject 103 (i.e., standing by for imaging, based on an X-ray from the X-ray tube 101).

The image reading control unit 110 supplies to the X-ray generating control unit 126 an aperture signal A2, which is based on an instruction for adjusting an aperture quantity, input by the operator using the operating unit 121 (which may include dedicated input devices for this purpose, if desired). This can be done by the operator specifying the proper aperture setting, or by an automatic procedure that the operator merely initiates and that is based on past experience with the subject, or may be a default setting.

The X-ray generating control unit 126 supplies an aperture signal A3, which is based on the aperture signal A2 from the image reading control unit 110, to the X-ray aperture 102, thereby automatically setting the aperture quantity to a proper value, in accordance with the properties of the subject 103 as a photographing target.

In this case, if the operator is not satisfied with the automatic setting of the aperture quantity, the operator further instructs to adjust the aperture quantity by the aperture instructing unit and in this fashion can adjust the setting so as to include the portion of the subject 103 that is to be photographed.

The instruction for adjusting the aperture quantity from the operator, namely, an instructing signal (aperture signal A1, not shown) for the image reading control unit 110 is issued from the user I/F unit 117, the aperture signal A2 for the X-ray generating control unit 126 is sent from the image reading control unit 110, and the aperture signal A3 for the X-ray aperture signal 102 is issued from the X-ray generating control unit 126. Therefore, the X-ray aperture 102 opens/closes in accordance with the aperture signal A3.

The X-ray aperture 102 has an aperture portion with a rectangular form, and is constructed to make it possible to adjust the vertical and horizontal dimensions of the opening that define the size and shape of the field illuminated by the X-ray beam. It is possible to check to see if the X-ray aperture 102 is set properly to irradiate a predetermined portion of the subject properly by use of normal lamp light, and the X-ray aperture 102 is adjusted accordingly.

Once the aperture is properly set, the operator depresses the exposure button 125. This results in the exposure button 125 generating a trigger or exposure signal B1 to cause the X-ray vessel 101 to generate an X-ray.

The exposure signal B1 generated by the exposure button 125 is supplied to the image reading control unit 110 in the image reading unit 109.

The image reading control unit 110, to which the exposure signal B1 has been supplied, checks to see if the solid-state image pickup device 107 is standing by for imaging, by means of a state-of-a-drive notifying signal generated by the solid-state image pickup device 107. After that, if the check result is affirmative, the image reading control unit 110 issues an exposure permissive signal E1 to the exposure permissive switch 124. The exposure permissive signal E1 turns on the exposure permissive switch 124, thereby permitting the exposure signal B1 generated by the exposure button 125 to reach the X-ray generating control unit 126. This is shown as signal B2.

It is noted to use a switch labeled as a second switch of the exposure button 125, for the exposure signal.

After receiving the exposure signal B2 as mentioned above, the X-ray generating control unit 126 issues the exposure signal B3 to the X-ray tube 101 when the preparation for the X-ray generation is completed in the X-ray tube 101.

As a result, the X-ray tube 101 generates an X-ray beam. The cumulative X-ray radiation quantity received by the phototimer 105 during this period of operation of the X-ray 101, is supplied to the X-ray generating device control unit 126 as an X-ray quantity signal from the phototimer 105.

The X-ray generating device control unit 126 terminates the X-ray generation in the X-ray tube 101 once the X-ray quantity signal from the phototimer 105 indicates that the X-ray quantity received at the phototimer 105 has reached a predetermined quantity.

During the exposure, the X-ray beam from the X-ray tube 101 is transmitted through the subject 103, grid 104, and scintillator 106 in this order, and the light generated by the scintillator 106 is imaged on the solid-state image pickup device 107 as a transmitting optical image of the subject 103. The formed image is photoelectrically converted by the solid-state image pickup device 107 and outputted as an image signal. The image signal is digitized by the A/D converter 108, and the result is supplied to the image reading unit 109 as a digital image signal.

The image reading unit 109 develops the digital image signal from the A/D converter 108 onto the RAM 111. The developed signal is subjected to a variety of processes by the CPU 118, and the processed signal is displayed by the display 120 or output onto film.

[Case of providing and using the X-ray image photographing apparatus 100 in a bus or other vehicle for examination]

It is assumed that (for example) the examination bus (or other vehicle), which is provided with the X-ray image photographing apparatus 100, sequentially visits to three companies 1 to 3 (also referred to as "groups 1 to 3"), and radiography is performed for at least one examinee (employee) in each company.

Figure 2:
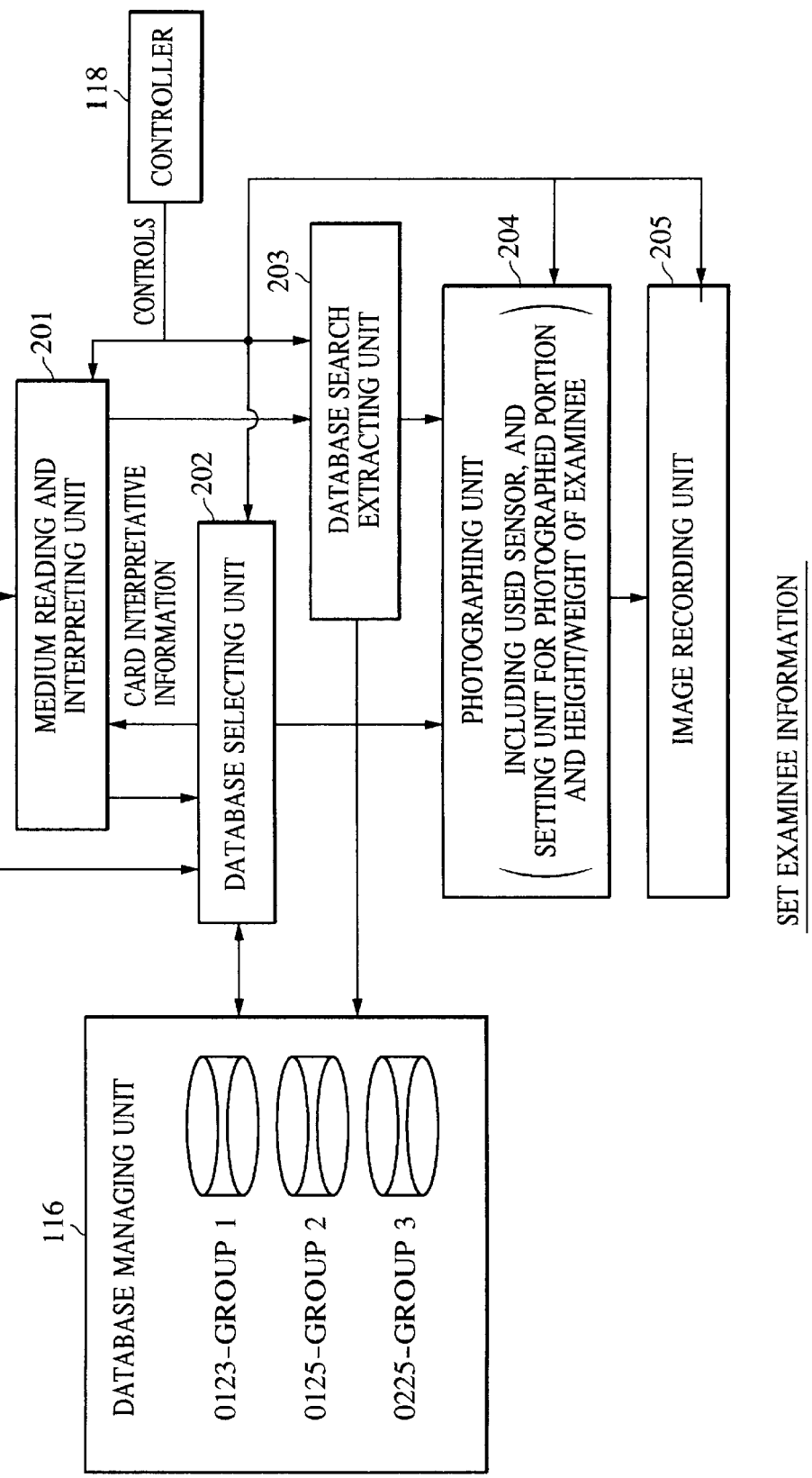
FIG. 2 is a block diagram for explaining databases of groups, when photographing a plurality of groups.

As shown in FIG. 2, a database is stored in advance in the nonvolatile storing unit 116 (see FIG. 1) every group, to which the radiography is executed. In other words, employee data in the companies 1 to 3, for which the radiography is scheduled, is stored in advance. A record which contains data has for one examinee may include the following:

examinee ID examinee name birth date of examinee sex of examinee height (cm)

weight (kg)

The database also stores an example or template of an employee card (such card may be a magnetic card) of his company or information on how to read or interpret an employee ID which is recorded in a bar code on an examination note, that is, information (sometimes hereinafter "recognizing information") regarding for reading the employee ID in the magnetic card reading unit 122 or bar code reading unit 123 (see FIG. 1). As the information, the following is included:

start byte number of company code end byte number of company code company code start byte number of employee ID end byte number of employee ID Incidentally, when reading the employee ID, both the bar code and the magnetic card may be used. Herein, since both the magnetic card reading unit 122 and the bar code reading unit 123 are connected as input devices, both may be used.

In the case of a company using a magnetic card which includes no company code, the start byte number of the company code and the end byte number of the company code are "0" in this embodiment.

As shown in FIG. 2. the controller 118 for controlling the operation for the whole apparatus has control functions for the following processing function units (preferably software components, although dedicated circuitry with a customized CPU is also within the invention), i.e.; a medium reading/interpreting unit 201; a database selecting unit 202; a database search extracting unit 203; a photographing control portion 204 to control photographing; and an image recording control unit 205. By reading out and executing a processing program in accordance with a flowchart shown in FIG. 3 from the ROM 112, the operation is controlled as follows.

Step S301:

First, when the examining bus arrives at a company for which examinations are scheduled, it is necessary for the operator to specify a corresponding database from the databases stored in the nonvolatile storing unit 116, as stated above.

Figure 3:
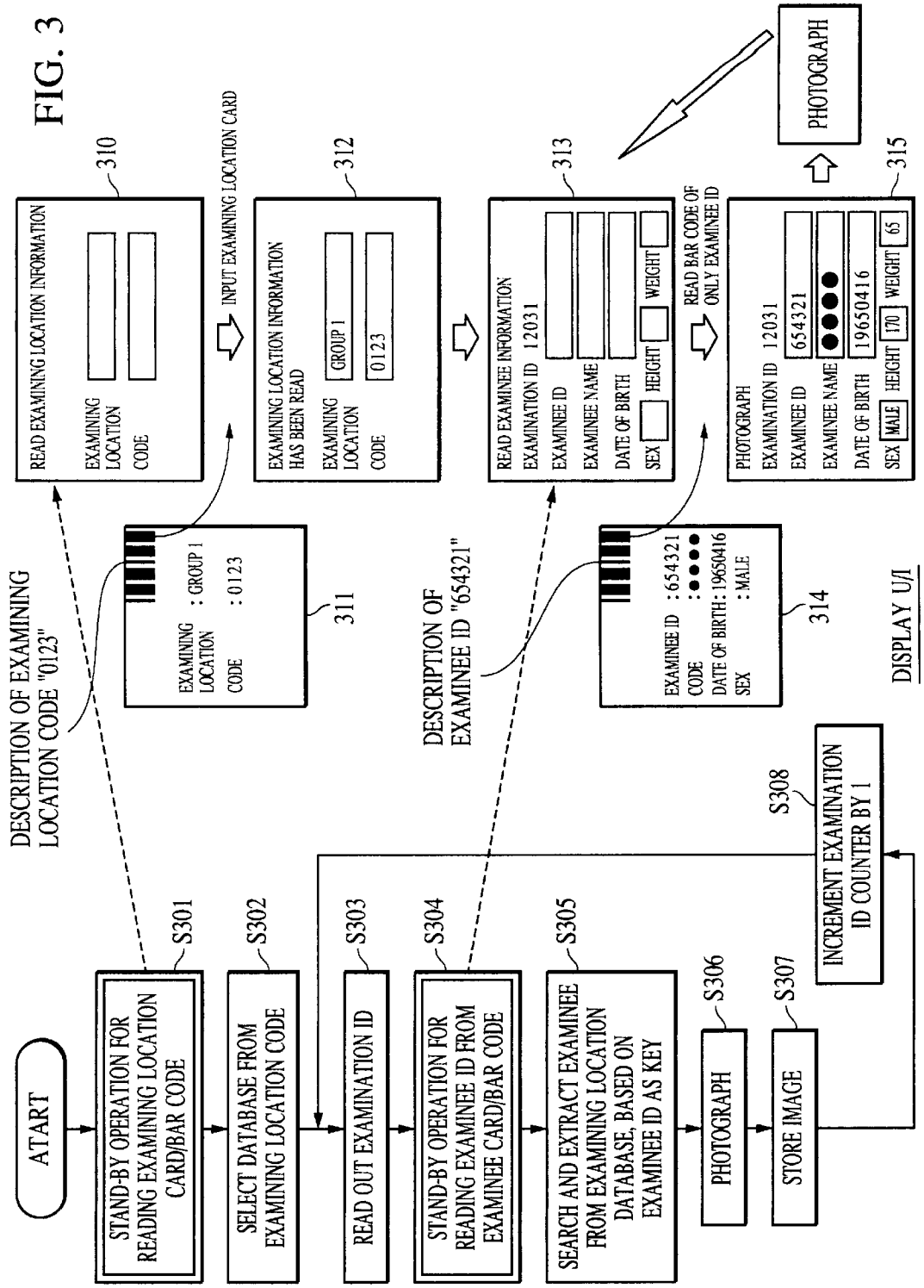
FIG. 3 is a diagram for explaining photographing by use of the database.

As shown at 310 in FIG. 3, a message for instructing a data input to select the database is displayed on the display 120. The operator causes the bar code reading unit 123 to read a bar code 311 indicating the company in question, which is prepared in advance by the examining center.

The bar code reading unit 123 reads the data recorded in the set bar code 311, and supplies it to the medium reading/interpreting unit 201.

The medium reading/interpreting unit 201 checks to see if the data from the bar code reading unit 123 is the data for selecting a database. As a discriminating method, it is predetermined to use, as data for selecting the database, data whose head has a specific character train (such as four characters, i.e., "C?#!") and the specific character train is detected. After detecting that specific character train for selecting the database and reading the data for selecting the database, the medium reading/interpreting unit 201 supplies to the database-selecting unit 202, data indicating the company name code (examining location code), subsequent to the database-selecting data.

As a method of obtaining the database-selecting data, for example, a company list may be displayed on the display 120, and the operator may select the proper company from the company list. In this case, when the operator selects from the company list by using the operating unit 121 (such as the mouse), the selected result is transmitted to the database-selecting unit 202 through the user interface (I/F) unit 117.

Step S302:

The database-selecting unit 202 searches the database that corresponds to the company name code (examining-location data) read by the medium reading/interpreting unit 201, from the nonvolatile storing unit 116, and the searched database is read from a main storage unit. It is exemplified that the RAM 11 is utilized as a work memory and the searched database is read therefrom.

Once the corresponding database has been selected, a message including the "examining location" and "code" is displayed on the display 120, as shown at 312 in FIG. 3.

Step S303:

The CPU 118 generates the examination ID.

The "examination ID" is used to identify the result of one examination uniquely, and this value is also stored as information annexed to the image simultaneously with the image storage, which will be explained hereinafter. When the X-ray image photographing apparatus 100 stars photographing, a value is allocated to the variable "examination ID", starting with 1, the allocated value is increased sequentially upon the taking of every photograph, so that the same number is not allocated to more than one photograph.

Step S304:

The display 120 displays a message instructing to insert the employee card, as shown at 313 in FIG. 3.

When an employee is examined in the examining bus, the operator receives the employee's employee card 314, and inserts it into (for example) the magnetic card reading unit 122.

The magnetic card reading unit 122 reads the employee ID (examinee ID) recorded in the inserted employee card 314, and supplies the data to the medium reading/interpreting unit 201.

The medium reading/interpreting unit 201 detects that there is no specific character train (i.e., such as the four characters, "C?#!" given above as an example, indicative of data for selecting the database) in the head of the data from the magnetic card reading unit 122, thereby recognizing that the data is from an employee card. In accordance with the start byte number and end byte number of the employee ID, a character train therebetween is extracted and supplied to the database search extracting unit 203.

Incidentally, in many cases, the information in the employee card includes an identifier of the company that issued the card (company code), indicating that the card is an employee card of that company. In such cases, the start byte number of the company code is different from the end byte number of the company code. By determining whether the code between the start byte number and the end byte number matches the company code, it is discriminated whether or not the read information is the code of the company. If it is determined in this manner that the card is not an employee card, such a message is notified to the operator via the display unit, and the read information is rejected.

Step S305:

The database search extracting unit 203 searches and extracts a record corresponding to the character train (employee ID) supplied by the medium reading/interpreting unit 201 from the read-out data in step S302, and supplies it to the photographing unit 204.

The display 120 displays a message including the contents of the record obtained by the search and extraction, namely, the examinee ID, code (examinee name), date of birth of the examinee, sex of the examinee, height, and weight, as shown at 315 in FIG. 3.

Steps S306 and S307:

The photographing unit 204 executes radiography. The image storing unit 205 stores the X-ray image information obtained by the photographing unit 204 in the nonvolatile storing unit 116. In this case, the examination ID is also stored as information annexed to the X-ray image information.

Step S308:

After completing the radiography of one employee in steps S303 to S307, the CPU 118 increases the value of the examination ID parameter by 1. Thereafter, the processing routine returns to step S303, and executes processing for the radiography of the next employee (if any).

[Image processing in the X-ray image photographing apparatus 100]

Figure 4:
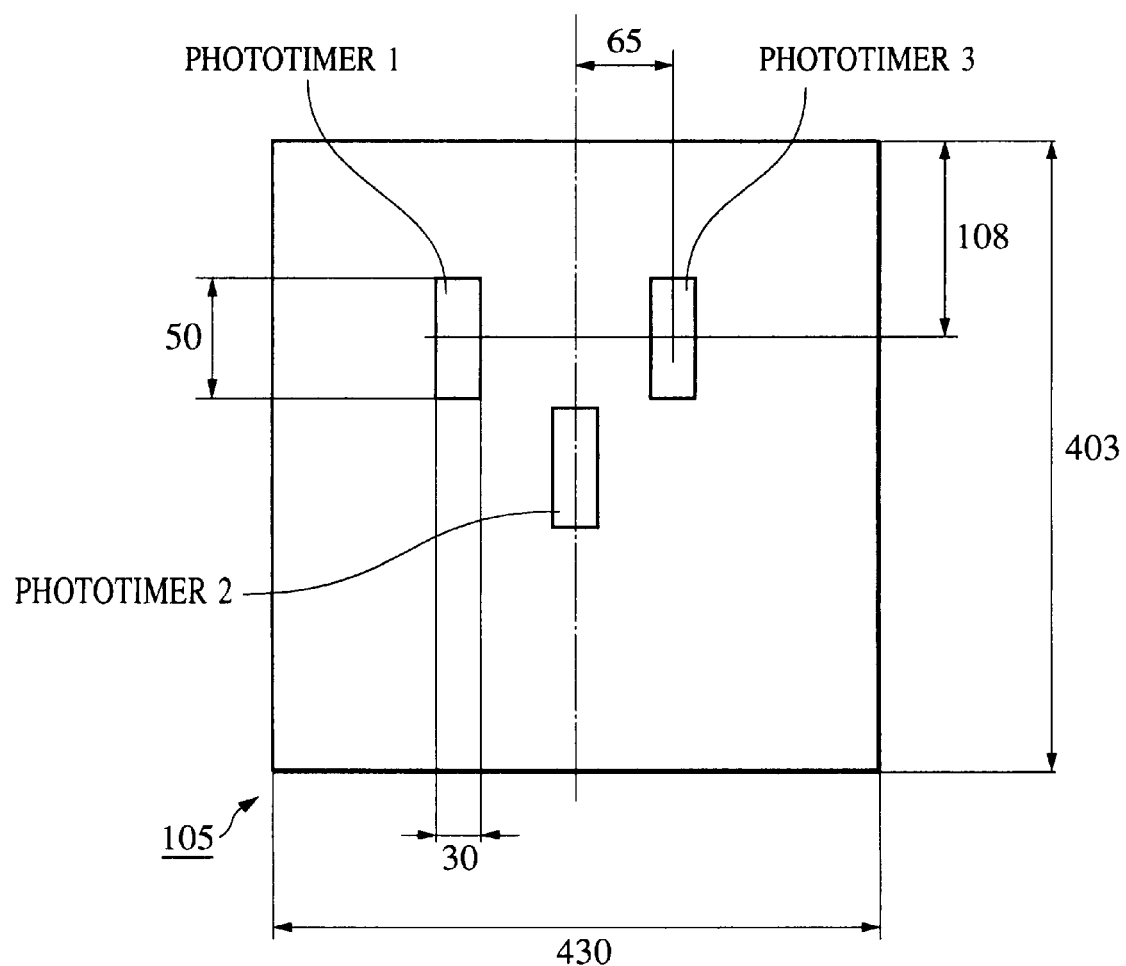
FIG. 4 is a diagram for explaining the construction of a phototimer in the X-ray image photographing apparatus.

A discrimination is made as to whether or not the radiography has been performed properly, based upon the X-ray quantity generated by the X-ray vessel 101. Generally, an X-ray generating device is provided with a phototimer, and the X-ray image photographing apparatus 100 has a phototimer system 105 with a construction shown in FIG. 4.

That is, three phototimers 1 to 3 are provided as parts of the phototimer system 105. It is able to designate an ON/OFF operation (i.e., selectively turn ON/OFF) of individual phototimers, to receive the X-ray quantity at various subsets of the phototimers 1 to 34, so that one can selectively monitor various portions of a photographed target.

For example, in the case of photographing the chest PA, only the phototimers 1 and 3 are turned on, and the phototimer 2 is turned off. Thus, the phototimer(s) at a region of interest to the doctor can be selected, to ensure exposure of that region to the proper X-ray dose; e.g., for lung radiography, only the phototimers 1 and 3, corresponding to the right and left lung fields, are relevant. This enables the photography to be conducted using the proper X-ray quantity.

In general, it will be understood that since phototimers are fixed in position by hardware, the phototimer(s) might not be in exactly the proper position within the lung field in the chest for chest PA radiography (for example), depending upon body size of the examinee. For instance, with a relatively broad examinee, the phototimer is inside of the optional position (i.e., closer to the middle of the chest). On the contrary, with a thin or small examinee, the phototimer is positioned out side of the optional position. When digital image information obtained from the radiography is subjected to density-conversion, the outputted image of the lung region is finely over-exposed or under-exposed.

To deal with this problem, the X-ray image photographing apparatus 100 has a defined "characteristic quantity" region, which unlike the phototimer positions is not fixed, but is based on the particular device being used for radiography, the photographed portion of the examinee, and the height/weight of the examinee. The digital image information obtained by the radiography is processed by density conversion, etc., on the basis of a pixel value applicable to the characteristic quantity region.

Figure 5:
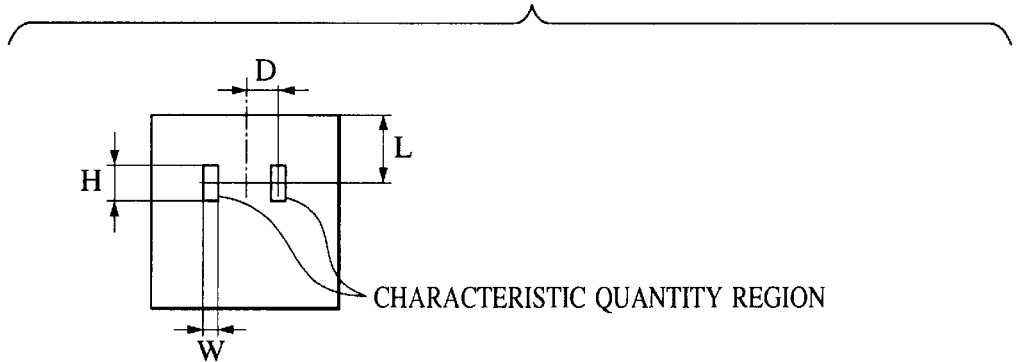
FIG. 5 is a diagram for explaining an image process using a value of a characteristic quantity region in the X-ray image photographing apparatus.

For example, FIG. 5 is a table showing the position of the characteristic quantity region (which is shown as including two portions), that depends on the height/weight of the examinee, for a particular X-ray image photographing apparatus 100 that uses a standing position sensor having a sensor area of a (43 cm×43 cm) square (this corresponds to the image pickup surface of the solid-state image pickup device 107), where the photographed portion is the chest PA and the examination is performed with the examinee standing. The height/weight of the examinee can be collected from the database as described above with reference to FIG. 2 and the corresponding characteristic quantity position is obtained from the table, and is employed in the image processing.

As another example, the characteristic quantity region position is exemplified as one position at the center, in photographing the chest LAT by radiography; in general, the table might be made variously depending upon the sensor used and the method of arranging the examinee's body, and depends also on the photographed portion.

Figure 6A:
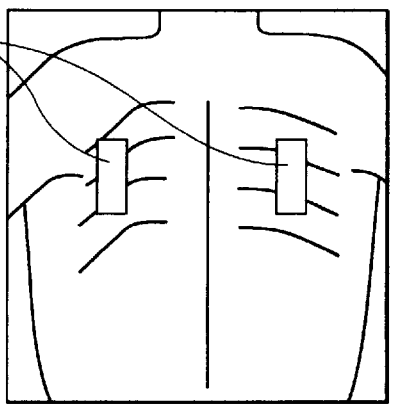
FIGS. 6A to 6C are diagrams for explaining that the position in a "characteristic quantity region" is varied, depending on the physique of the photographed person.
Figure 6B:
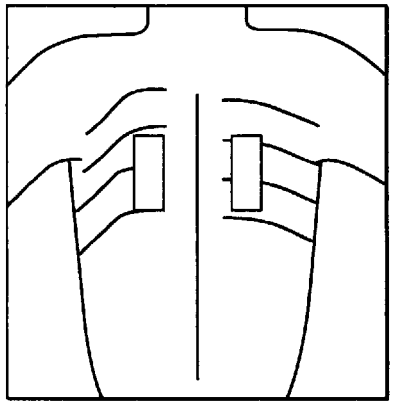
Figure 6C:
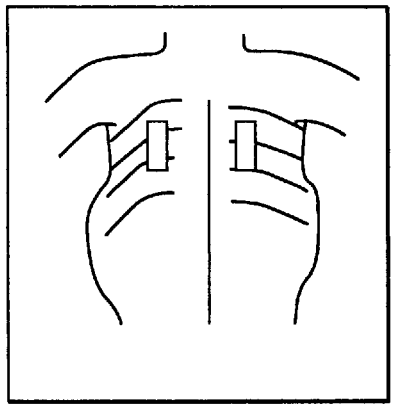

FIGS. 6A to 6C show examples of characteristic quantity regions for various examinee bodies (body sizes, shapes or types).

As shown in FIGS. 6A to 6C, the characteristic quantity region used for the image processing (density conversion) is finely varied by subject size (height and weight) in accordance with the table shown in FIG. 5, and the characteristic quantity region is set to be proper for the particular subject (the illustrated parameters L, D, W and H are explained in FIG. 5). As a consequence, the digital image information can be outputted with more suitable density and stability.

Figure 7:
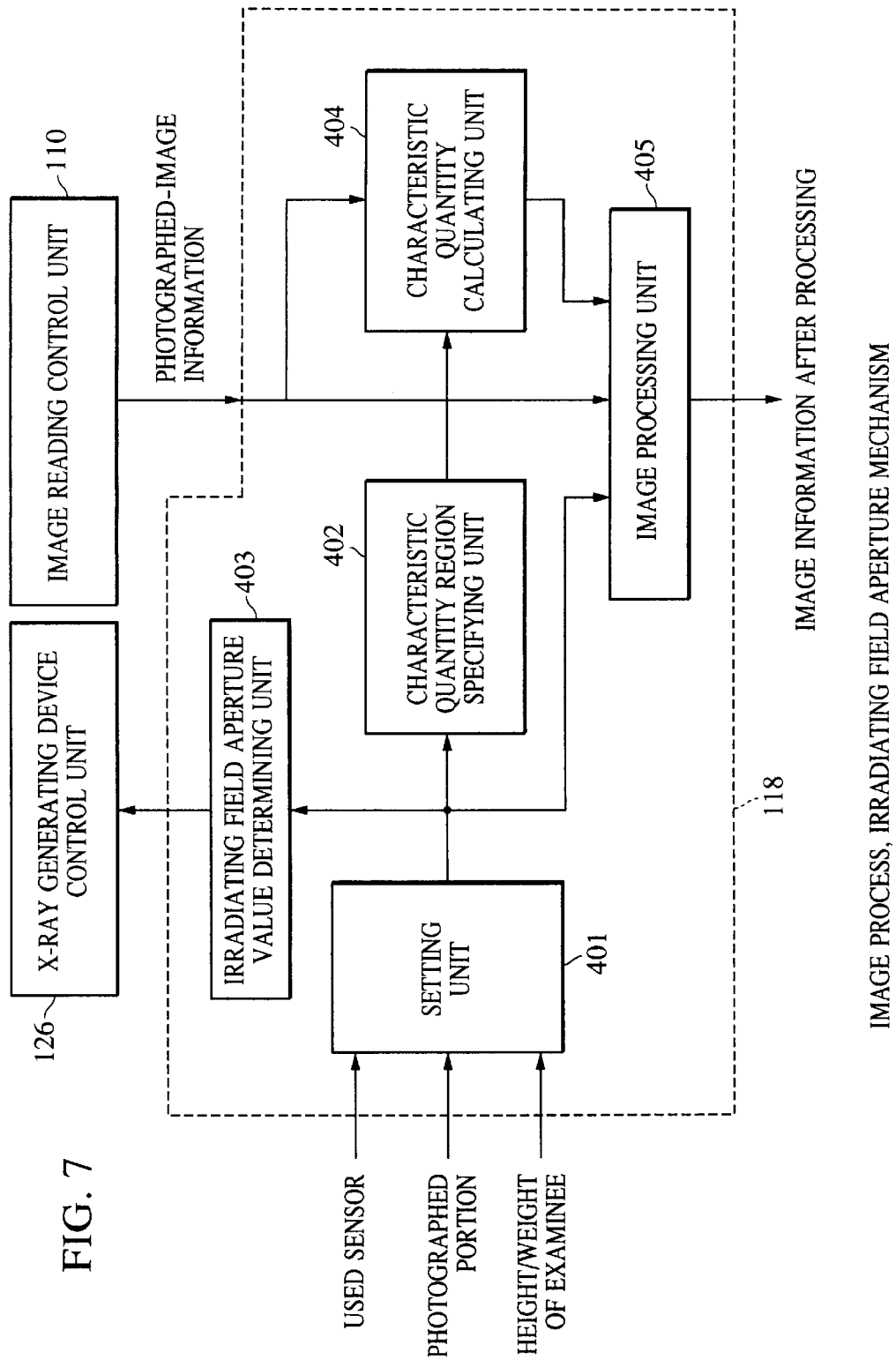
FIG. 7 is a block diagram for explaining a construction to employ the image processing described herein.

In order to implement the image processing, the controller 118 for controlling the operation of the whole apparatus has processing function units, i.e.: a setting unit 401; a characteristic quantity region designating unit 402; an irradiating field aperture value determining unit 403; a characteristic quantity calculating unit 404; and an image processing unit 405, as shown in FIG. 7. The controller 118 with this construction or software controls the operation as follows.

First, it is to be noted that the irradiating field aperture value determining unit 403 in FIG. 7 will be described in detail hereinafter.

First of all, the operator gives the setting unit 401 an instruction regarding the sensor being used and the portion being photographed, by means of the operating unit 121 (this information may, e.g., be input once for a series of examinees, provided the information is the same for all of them). The setting unit 401 obtains the information regarding the height/weight of the examinee from the database, as stated above. The setting unit 401 supplies to the characteristic quantity region designating unit 402, the entered information about the sensor and photographed portion (entered by the operator) and the information about the height/weight of the examinee obtained from the database, and also supplies to the image processing unit 405, the information about the sensor and photographed portion.

The setting unit 401 also supplies the foregoing information to the irradiating field aperture value determining unit 403 at this time.

The characteristic quantity region designating unit 402 selects a table corresponding to the information from the setting unit 401 from among the tables for the various combinations of sensor and photographed portion. If the standing position sensor photographs the chest PA by X-rays, for example, the table shown in FIG. 5 is selected herein.

The characteristic quantity region designating unit 402 determines the characteristic quantity region corresponding to the height/weight from the setting unit 401 from the selected table.

The characteristic quantity calculating unit 404 calculates characteristic quantities (such as a maximum, a minimum, an average, a median, and a mode of the pixel values) of the characteristic quantity region determined by the characteristic quantity region designating unit 402, from the digital image information obtained by (the image reading control unit 110) through radiography.

The image processing unit 405 subjects the digital image information obtained by the photographing unit 110a (the image reading control unit 110 and X-ray generating control unit 126) through radiography to image processing such as density conversion or gradation conversion, utilizing the characteristic quantity calculated by the characteristic quantity calculating unit 404, thereby generating what FIG. 7 show as the "image information after processing".

For example, the image processing unit 405 subjects the digital image information from the photographing unit to density-converting processing. The density-converting processing is conducted based upon a density-converting curve having a density-converting characteristic such that the characteristic quantity (referred to as an average of the pixel values in the characteristic quantity region, herein) from the characteristic quantity calculating unit 404 is equal to a proper density value on the display 120 or film (not shown).

Specifically speaking, the image processing unit 405 has a look-up table (simply referred to as an "LUT", hereinafter) that stores a plurality of density-converting curves for use as a reference in the density-converting processing; for example, a set of such curves may be provided for each possible photographed portion. The density-converting curve corresponding to the portion being photographed, is read out from the LUT.

The image processing unit 405 subjects the digital image information from the photographing unit to the density-converting processing in accordance with the generated density-converting curve, and outputs the processed information.

Successively, the image processing unit 405 shifts the density-converting curve read out from the LUT, in parallel such that the characteristic quantity (average, e.g., of the pixel values in the characteristic quantity region) from the characteristic quantity calculating unit 404 is equal to the proper density value, thereby to generate the density-converting curve which is actually used in the density-converting processing.

The image information after processing, which has been obtained from the image processing, is stored in the nonvolatile storing unit 116 once, and outputted on the display 120 or film, or alternatively is transmitted to the external network or external mobile medium recording device.

[Aperture quantity control in the X-ray image photographing apparatus 100]

The X-ray image photographing apparatus 100 automatically can set to a proper value, the aperture quantity of the X-ray aperture 102 by means of the X-ray generating control unit 126 in accordance with the properties of the photographed subject, as discussed above.

The irradiating field aperture value determining unit 403 shown in FIG. 7 sets the aperture quantity in this case as follows.

Figure 8:
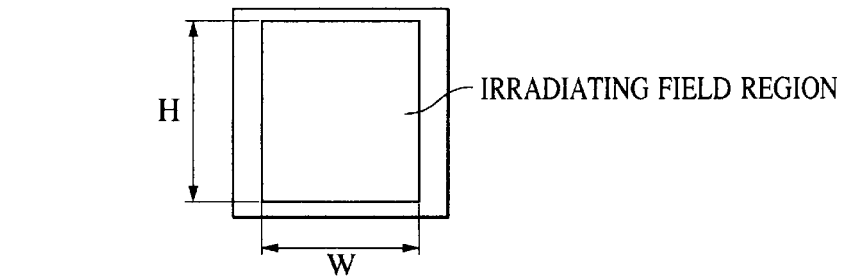
FIG. 8 is a diagram for explaining an automatic setting of an aperture quantity in the X-ray image photographing apparatus.

FIG. 8 is a table showing an irradiating field aperture value (size) that depends on the height/weight of the examinee, when the X-ray image photographing apparatus 100 uses a standing position sensor having a sensor area of a (43 cm×43 cm) square (an image pickup surface of the solid-state image pickup device 107), the photographed portion is the chest PA, and radiography is executed.

A table is prepared for each combination of sensor and photographed portion. The irradiating field aperture value determining unit 403 selects the table corresponding to the sensor and photographed portion from the setting unit 401, from among those tables, further obtains an irradiating field aperture value corresponding to the information about the height/weight of the examinee from the setting unit 401 from the selected table, and supplies the obtained irradiating field aperture value to the irradiating field aperture control unit (X-ray generating control unit 126). The irradiating field aperture control unit (X-ray generating control unit 126) adjusts the aperture quantity of the X-ray aperture 102, based on the irradiating field aperture value from the irradiating field aperture value determining unit 403.

The aforementioned construction enables the irradiating field to be set automatically, so that the operator can match the irradiating field with the target faster and more precisely. It is also possible to use the minimum sufficient irradiating field, and thus to avoid harmful effects on the health which may be caused for the examinee by larger dosages of X-rays.

[Storage of the digital image information collected by the X-ray image photographing apparatus 100]

The information labeled as the examination ID (see FIG. 3) is added to the digital image information obtained through the radiography, and stored.

That is, the X-ray image photographing apparatus 100 generates the examination ID therein, in order to identify the examination uniquely. The examination ID is stored as information annexed to the digital image information as well as the image. Therefore, even if the apparatus power source is shut off, it is necessary to increment the examination ID by 1 for every examination without issuing the same number twice, and thus that the latest value is stored into the nonvolatile storing unit 116.

In a case where trouble occurs in the nonvolatile storing unit 116 for some reason and the nonvolatile storing unit 116 must be replaced, the examination ID must be reset.

Then, the X-ray image photographing apparatus 100 utilizes both the nonvolatile storing unit 116 (assumed to be, e.g., a hard disk, herein) and an NVRAM 115, using them to store the current examination ID value, by using the nonvolatile storing unit 116 as a first storage medium and the NVRAM 115 as a second storage medium for back-up.

If either the nonvolatile storing unit 116 and the NVRAM 115 is broken, the broken device should be exchanged. In this case, it is considered to automatically use the value of the examination ID which is stored in the other of these two devices, as back-up.

Moreover, when desiring to use neither stored value of the examination ID (for instance, when newly applying the nonvolatile storing unit 116 (hard disk: HD) from another device and installing it), it is incapable of automatically using the examination ID value stored in the NVRAM 115. Therefore, an appropriate message is transmitted to inquire of the operator, by way of the user I/F 117, and the CPU controls whether or not to use the current stored examination ID value which is back-up at present, in accordance with a responsive instruction from the operator.

If the instruction from the operator indicates that the back-up examination ID value is not to be automatically used, the device accepts the instruction. In order to provide against a case in which the instruction from the operator is an error, the back-up examination ID value is stored apart, and the storing destination in this case is itself stored in the NVRAM 115. In other words, the NVRAM 115 includes two storing areas (indicated by "NVRAM 115a" and "NVRAM 115b", hereinafter), as shown in FIG. 1. The storing areas (115a and 115b) are independent of each other so as to store information individually. The NVRAM 115a corresponds to the second storage medium and the NVRAM 115b corresponds to a third storage medium. This construction enables prompt recovery due to the information from the NVRAM 115b (the third storage medium), when the operator finds out that he/she has erroneously input an examination-ID reset instruction.

Then, although the two NVRAM portions/areas 115a and NVRAM 115b, which are obtained by separating the same NVRAM 115, are used as second and third storage mediums herein, the whole NVRAM 115 may be used as a second storage medium and another nonvolatile storage medium (such as nonvolatile RAM or HD) may be used as the third storage medium.

Although the HD is used as a first storage medium and the NVRAM is used as a second medium, the first and second storage mediums are not limited thereto. For example, contrarily, an NVRAM may be used as a first storage medium and an HD may be used as a second storage medium. Alternatively, an HD or NVRAM may be utilized as both first and second storage mediums.

When the present apparatus operates, the present examination ID value is stored in a main storage (RAM 111), and the examination ID value on the RAM 111 is updated upon every photographing. Upon a certain photographing end time (e.g., at the end of a day of examinations), the current examination ID value on the RAM 111 is stored into the HD 116 and the NVRAM 115a. Accordingly, whenever the apparatus is turned off, the current examination ID value is stored.

Figure 9:
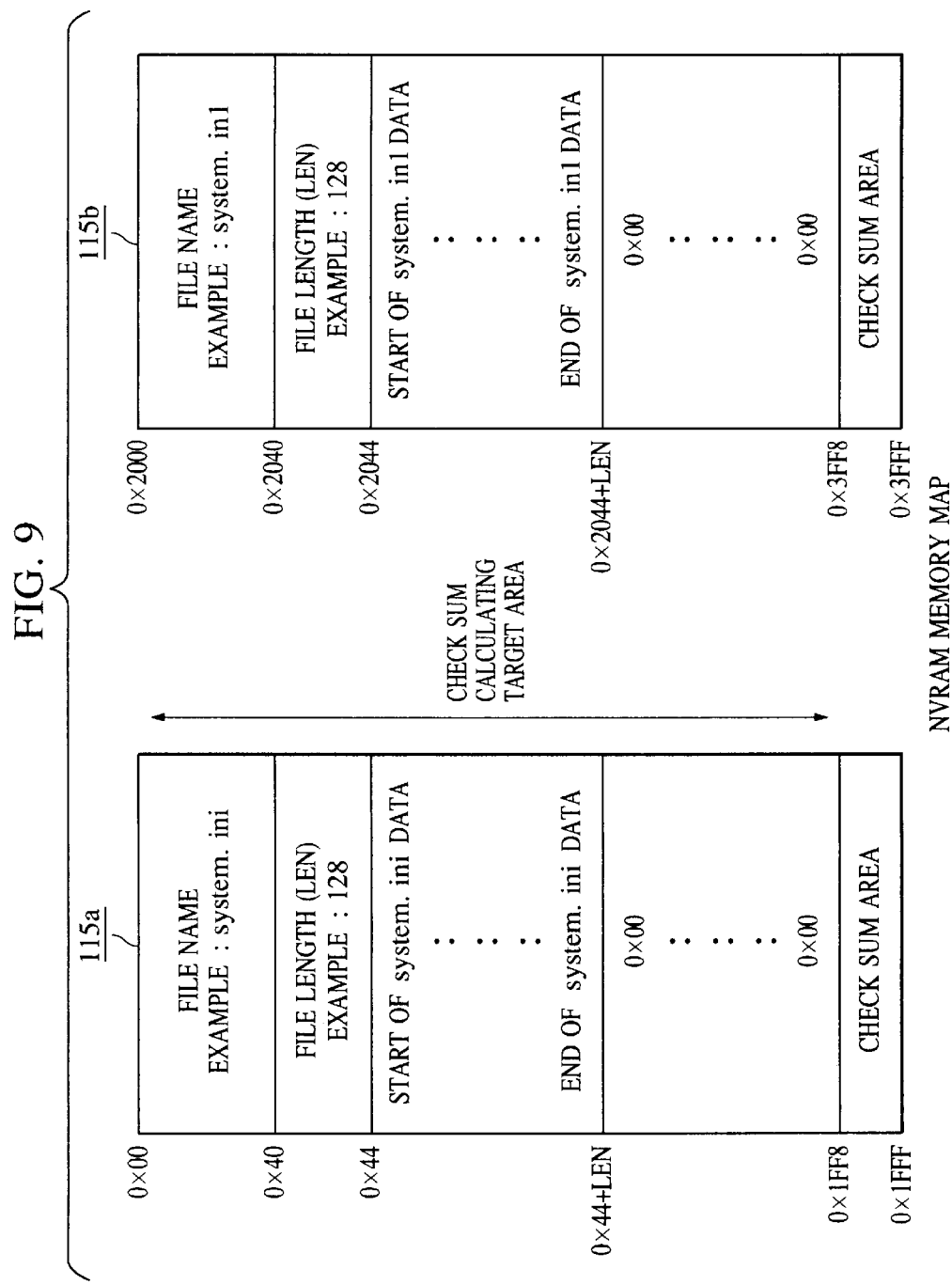
FIG. 9 is a diagram for explaining a format to store information in a recovery process in the X-ray image photographing apparatus.

FIG. 9 shows a format used when writing a file in which the examination ID value is stored, into the NVRAMs 115a and 115b as back-up storage.

In the case of writing a file named "System.ini" into the NVRAM 115a, the file name "system.ini" is written into a space from a first address 0x00 to an address 0x40 (64 bytes) and "0x00" is written into a space. Subsequently, a file length (LEN) is written between addresses 0x40 and 0x44, and data corresponding to the file length is written to the subsequent addresses.

Similarly to NVRAM 115a, when writing a file named "System Inc." into the NVRAM 115b, the file name "System Inc." is first written into an area from a first address 0x2000 to 0x2040 (64 bytes) and "00x0" is written into a space. Sequentially, a file length (LEN) is written between addresses 0x2040 and 0x2044, and data corresponding to the file length is written to the subsequent addresses.

Then, "0x00" is written in the unused portion in the memory and this writing operation is conducted in an initializing process, which will be described hereinafter. Written into a "check sum area" within addresses 0x1OFF8 to 0x1OFF in FIG. 9 is a value obtained by check sum calculation in a check sum process, which will be explained later on.

For the purpose of employing the process (information recovering process), the CPU 118 reads out a processing program according to a flowchart shown in FIG. 10 from the ROM 112 and executes the program, thereby controlling the operation as follows.

Note that the examination ID is stored in file "System.ini" as shown in FIG. 9.

(1) Case of storing the information in both the HD 116 (first storage medium) and the NVRAM 115a (second storage medium)

Step S501:
First, a check sum of the NVRAM 115a is calculated.
Step S502:
Next, it is discriminated whether or not the check sum obtained in step S501 is equal to a check sum in the NVRAM 115a. In this case, since back-up information is correctly stored in the NVRAM 115a, it is determined that the check sum is equal to the check sum on the NVRAM 115a, and the processing routine advances to step S503.
Step S503:
In the present step, it is discriminated whether or not there is a file "System.ini", in which the examination ID value is stored, in the HD 116. It is normally determined that there is the file "System. ini" in the HD 116, and then the processing routine advances to step S510 as the next step.
Step S510:
In the present step, the contents (of "System ini") stored in the HD 116 are transferred to the main storage unit (RAM 111). Based on the information (including the examination ID) in the main storage unit, the photographing operation is performed.

(2) Case of storing information in the HD 116 (first storage medium) and storing no information in the NVRAM 115a (second storage medium)

Step S501:
First, a check sum of the NVRAM 115a is calculated.
Step S502:
It is discriminated whether or not the check sum obtained in step S501 is equal to the check sum on the NVRAM 115a. Herein, for example, NVRAM 115a is exchanged for a new NVRAM, or information cannot be stored in NVRAM 115a (such as in the case of a battery error) and the like, so that it is determined that the check sum obtained in step S501 is not equal to the check sum on the NVRAM 115a and, then, the processing routine advances to step S511 as the next step.
Step S511:
In the present step, it is discriminated whether or not there is a file "System.ini", in which the examination ID value is stored, in the HD 116. As it is determined in step S511 that there is a file "System ini" in the HD 116, the processing routine advances to step S512 and steps subsequent thereto.
Step S512 to step S516:
In the present steps, the contents (of "System.ini") stored in the HD 116 are transferred to the main storage unit (RAM 111) (step S512), the contents of the NVRAM 115a are cleared to "0x00" (step S513), information in the main storage unit (RAM 111) is stored into the NVRAM 115a (step S514), and a check sum of the NVRAM 115a is calculated and stored into the NVRAM 115a (step S515).

The information is stored in the NVRAM 115a, only when that memory is capable thereof. In the case of exchanging the NVRAM 115a for a new NVRAM, the information in the HD 116 has been stored, so that the operation for storing the information in the NVRAM 115a is important. Thereafter, a message, e.g., "NVRAM battery error or new NVRAM. Call service if this message occurs upon every initialization." is displayed on the display 120, via the user I/F unit 117 (step S516) and then the present process ends. Thus, when information cannot be stored in the NVRAM 115a, (battery error of the NVRAM 115a, etc.) and the like, the process in step S516 is executed on every initialization, and the system thus is able to notify the operator via a message that the information in the HD 116 cannot be copied to the NVRAM 115a correctly.

Note that the system is re-initialized without performing a system ending process, which will be described later on. Therefore, it is unable to cause the troublesome situation in which that the photographing process is conducted and the ID is changed.

(3) Case of storing no information in the HD 116 (first storage medium) and storing the information in the NVRAM 115a (second storage medium)

Step S501:
First, a check sum of the NVRAM 115a is calculated.
Step S502:
It is discriminated whether or not the check sum obtained in step S510 is equal to a check sum on the NVRAM 115a. Herein, the HD 116 is exchanged for a new HD, or information cannot be stored in the HD 116 (such as a case of failure due to the damage of a disk surface, etc.) and the like. Since back-up information is stored in the NVRAM 115a correctly, it is determined that the check sum obtained in step S501 is equal to the check sum on the NVRAM 115a and, then, the processing routine advances to step S503.
Step S503:
In the present step, it is discriminated whether or not there is a file "System.ini", in which the examination ID value is stored, in the HD 116. If it is determined in step S503 that there is no file "System ini" in the HD 116, the processing routine advances to step S504 as the next step.
Step S504:
In the present step, a message, e.g., "HD battery error or new HD. Call service if indicating this message every initialization." is displayed on the display 120, via the user I/F unit 117. Thus, when information cannot be stored in the HD 116 and the like, the process in step S516 is executed upon every initialization, and the system is able to notify the operator that the information in the HD 116 cannot be copied.
Step S505:
A message, e.g., "Operation for retrieving back-up information from HD is OK?" is displayed on the display 120, via the user I/F unit 117. An instruction from the operator in response to this message is discriminated. As a determined result, if OK (the back-up information has been retrieved from the HD 116), the processing routine advances to step S506. If NO in step S505, the processing routine advances to step S507 and steps subsequent thereto.
Step S506:
When there is an "OK" instruction from the operator (the back-up information in the NVRAM 115a has been retrieved form the HD 116), information "System.ini"in the NVRAM 15a is transferred (information-recovered) to the main storage unit (RAM 111), a system ending process, which will be described hereinafter, is executed, and the present processing ends. Incidentally, information in the RAM 111 is written into the HD 116 in the system ending process, as will be described hereinbelow. Thus, the back-up information in the NVRAM 115a is stored in the HD 116.

Step S507 to step S509:

When there is a "NO" instruction from the operator (the back-up information in the NVRAM 115a has not been retrieved from the HD 116), the information in the NVRAM 115a is abandoned, and there is no information in the HD 116. Therefore, the information as default initializing data of the system is stored into both the NVRAM 115a and the HD 116. If the operator were to enter "NO" erroneously, this would result in erasing the important examination ID value. Therefore, when the operator enters "NO" in response to this query, the information in the NVRAM 115a is temporarily transferred to the main storage unit (RAM 111) (step S507). Thereafter, the data is stored into the NVRAM 115b (third storage medium) under another file name (referred to as "System.in1", herein) (step S508). Information contained in the file "System.ini" in the main storage unit (RAM 111) is set to a default and initialized (step S509). A system ending process, which will be described hereinafter, is executed, and the present processing ends.

Then, if the operator finds that he/she has made such an error upon system initialization, it is possible to recover the information abandoned from the NVRAM 115a, from the information "System.in1" stored in the NVRAM 115b (third storage medium). When the operator selects a process "Recover previous back-up information" by way of the user I/F unit 117, the data in the file "System.in1" in the NVRAM 115b (third storage medium) is called to the main storage unit (RAM 111) and is copied or moved to the file "System.ini", and a system ending process as will be explained hereinafter is executed. Thus, the file "System.ini" is stored to both of the NVRAM 115a and the HD 116", thereby realizing the information recovery.

(4) Case of storing information to neither the HD 116 (first storage medium) nor the NVRAM 115a (second storage medium)

Step S501:

First, the check sum of the NVRAM 115a is calculated.

Step S502:

Next, it is discriminated whether or not the check sum obtained in step S501 is equal to the check sum on the NVRAM 115a. Herein, if NVRAM 115a is exchanged for a new NVRAM, or information cannot be stored in the NVRAM 115a (such as because of a battery error) and the like, so that it is determined that the check sum obtained in step S501 is not equal to the check sum on the NVRAM 115a, then the processing routine advances to step S511 as the next step.

Step S511:

In the present step, it is discriminated whether or not the file "System.ini", in which the examination ID value is stored, is present in the HD 116. Herein, if the HD 116 is exchanged for a new HD 116, or the information cannot be stored in the HD 116 (such as because of a the battery error) and the like, it is determined that there is no file "System.ini" in the HD 116, and then the processing routine advances to step S517 and steps subsequent thereto.

Step S517 to step S522:

First, the NVRAM 115a is cleared to "0x00" (step S517).

The information in the main storage unit (RAM 111) is set to a default and initialized (step S518). The contents (the contents of the initialized "System.ini" file) of the main storage unit (RAM 111) are stored into the NVRAM 115a (step S519). A check sum of the NVRAM 115a is calculated and stored into the NVRAM 115a (S520). The contents (the contents of the initialized file "System.ini") in the main storage unit (RAM 111) are also stored into the HD 116 (step S521). Thereafter, a message, e.g., "NVRAM and HD are new or errors has occurred. Call service if this message occurs upon every initialization." is displayed on the display 120, via the user I/F unit 117 (step S522), and then the present processing ends.

Note that the system ending process described hereinafter is not performed, in this case.

Figure 11:
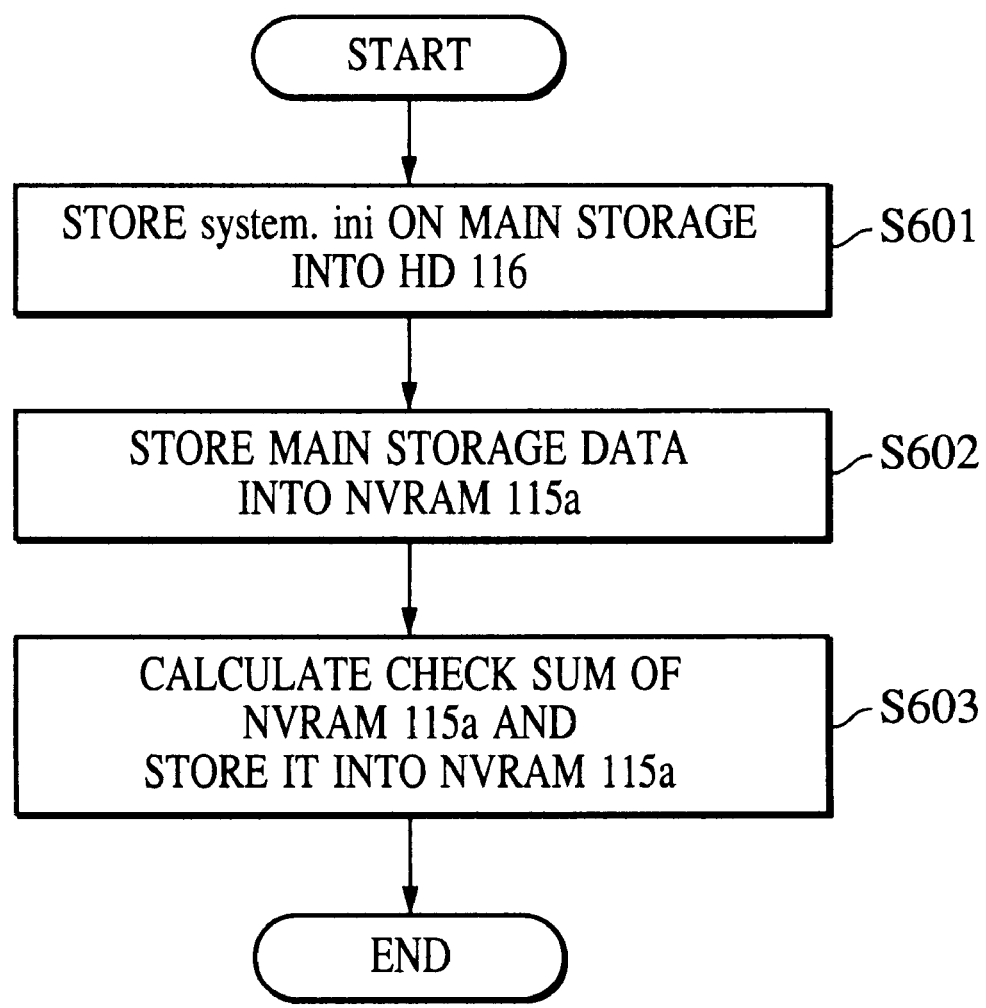
FIG. 11 is a flowchart for explaining a system-ending process of the recovery process.

FIG. 11 is a flowchart showing the system ending process in the information recovering process.

Step S601:

The file "System.ini" in the main storage unit (RAM 111) is stored into the HD 116 (first storage medium).

Step S602:

The file "System.ini" in the main storage unit (RAM 111) is stored into the NVRAM 115a (second storage medium).

Step S603:

A check sum of the NVRAM 115a is calculated and stored into the NVRAM 115a. However, if the result of the calculated check sum were written into an area the contents of which are included in the check sum calculation, the check sum values will not match upon subsequent check sum collation. Accordingly, the holding area for the check sum in the NVRAM 115a is not included in the check sum calculation.

Then, according to the present embodiment, although an implementation by software is shown because this makes the embodiment easier and the description simpler, the present invention is not limited thereto, and implementation by hardware is also possible, and is believed to be within the ordinary skill in the art. In this case, the process can be executed faster.

Although the present embodiment is an application of the present invention to radiography, the present invention is not limited thereto, but is also applicable to other photography, e.g., photography utilizing visible light.

Obviously, the objects of the present invention are accomplished by supplying to the system or apparatus, a storage medium storing executable code to implement the functions of a host or terminal according to the particular embodiment, and by reading out and executing the code stored in the storage medium by means of a computer (or CPU or MPU) in the system or apparatus.

In this case, the program code which is read out from the storage medium itself realizes the functions of the embodiments, and the present invention comprises the storage medium storing the program code.

As for the storage medium to supply the program code, it is capable of using a ROM, a floppy disk, a hard disk, an optical disk, a magnet-optical disk, a CD-ROM, a CD-R, a magnetic tape, or a nonvolatile memory card, etc.

Further, obviously, the present invention also includes a case of realizing the functions of the embodiments not only by executing code which the computer reads out, but also by performing a part or all of the processing by an OS, etc. operating on the computer on the basis of instructions of the code.

Furthermore, obviously, the present invention also includes a case of realizing the functions of the embodiments by writing the program code read out from the storage medium into a memory provided for a function expansion board inserted in the computer or a function expansion unit connected to the computer, and thereafter executing a part or all of the actual processing by the CPU, etc., provided for the function expansion board or function expansion unit on the basis of the instruction of the program code.

What is claimed is:

1. An apparatus adapted for photographing, after inputting first information that contains at least group identification information and inputting second information that contains at least examinee identification information, a radiographic image of an examinee using the examinee information searched from a database based on the inputted information, said apparatus comprising:

an input unit for inputting first information that contains at least group identification information or second information that contains at least examinee identification information;

a medium reading and interpreting unit for analyzing a character train of the information inputted by the input unit and extracting the group identification information or the examinee identification information;

a nonvolatile storing unit for storing databases of the examinee information corresponding to each of a plurality of sets of group identification information and data structure of the second information corresponding to each of a plurality of sets of group identification information;

a database selecting unit for selecting, from the nonvolatile storing unit, a database of the group corresponding to the extracted group identification information;

a database search extracting unit for searching and extracting examinee information corresponding to the extracted examinee identification information from the selected database; and a photographing unit for photographing a radiographic image of the examinee based on the searched and extracted examinee information, wherein the medium reading and interpreting unit, when the first information is inputted, reads in, from the nonvolatile storing unit, the data structure of the second information corresponding to the group identification information contained in the first information, and analyzes the character train of the second information based on the data structure.

2. An apparatus according to claim 1, wherein the medium reading and interpreting unit decides whether the information is the first information or the second information, based on an identification character among the character train.

3. An apparatus according to claim 1, wherein the photographing unit further comprises:

an X-ray vessel for radiating radiant rays;

an X-ray apparatus for limiting the area in which the X-ray vessel radiates the radiant rays;

a solid-state image pickup device for radiographing an examinee irradiated with radiation of which the area of radiation has been limited by the X-ray apparatus, and for thus obtaining radiographic image data; and an irradiating field aperture value determining unit for controlling the X-ray apparatus, wherein the irradiating field aperture value determining unit controls the X-ray apparatus based on the searched and extracted examinee information.

4. An apparatus according to claim 1, further comprising an image processing unit for processing the radiographic image of the examinee, wherein the image processing unit processes the image based on the searched and extracted examinee information.

5. An apparatus according to claim 1, further comprising:

a characteristic quantity region specifying unit for specifying a region on the radiographic image of the examinee;

a characteristic quantity calculating unit for calculating a characteristic quantity from the region; and an image processing unit for designating the curve profile of the density-converting curve based on the character quantity, wherein the characteristic region specifying unit specifies the region based on the searched and extracted examinee information.

6. An apparatus according to claim 3, 4 or 5, wherein the examinee information includes at least the height or weight of the examinee.

7. An apparatus according to claim 1, wherein the input unit is a bar code reader or a magnetic card reader.

8. A method for photographing, after inputting first information that contains at least group identification information, and inputting second information that contains at least examinee identification information, a radiographic image of an examinee using examinee information searched from a database based on the inputted information, said method comprising the steps of:

inputting first information that contains at least group identification information or second information that contains at least examinee identification information;

reading and interpreting a character train of the information inputted in said inputting step, by analyzing that character train and extracting the group identification information or the examinee identification information;

storing, in a non-volatile storing unit, databases of the examinee information corresponding to each of a plurality of sets of group identification information and data structure of the second information corresponding to each of a plurality of sets of group identification information;

selecting, from the nonvolatile storing unit, a database of the group corresponding to the extracted group identification information;

searching for and extracting examinee information corresponding to the extracted examinee identification information from the selected database; and photographing a radiographic image of the examinee based on the searched and extracted examinee information, wherein, when the first information is inputted, said reading and interpreting step includes reading in, from the nonvolatile storing unit, the data structure of the second information corresponding to the group identification information contained in the first information, and analyzing the character train of the second information based on the data structure.

9. A computer-readable storage medium, storing in computer-readable form, computer-executable code for a method for photographing, after inputting first information that contains at least group identification information, and inputting second information that contains at least examinee identification information, a radiographic image of the examinee using the examinee information searched from a database based on the inputted information, said method comprising the steps of:

inputting first information that contains at least group identification information or second information that contains at least examinee identification information;

reading and interpreting a character train of the information inputted in said inputting step, by analyzing that character train and extracting the group identification information or the examinee identification information;

storing, in a non-volatile storing unit, databases of the examinee information corresponding to each of a plurality of sets of group identification information and data structure of the second information corresponding to each of a plurality of sets of group identification information;

selecting, from the nonvolatile storing unit, database of the group corresponding to the extracted group identification information;

searching for and extracting examinee information corresponding to the extracted examinee identification information from the selected database; and photographing a radiographic image of the examinee based on the searched and extracted examinee information, wherein, when the first information is inputted, said reading and interpreting step includes reading in, from the nonvolatile storing unit, the data structure of the second information corresponding to the group identification information contained in the first information, and analyzing the character train of the second information based on the data structure.

* * * * *

UNITED STATES PATENT AND TRADEMARK OFFICE
CERTIFICATE OF CORRECTION

PATENT NO. : 6,789,087 B1
DATED : September 7, 2004
INVENTOR(S) : Tsukasa Sako

It is certified that error appears in the above-identified patent and that said Letters Patent is hereby corrected as shown below:

<u>Title page,</u>
Item [75], ABSTRACT,
Line 3, "a" should be deleted.

<u>Column 1,</u>
Line 66, delete "discussed-above" should read -- discussed above --.

<u>Column 2,</u>
Line 32, "identify" and insert -- indentity --.

<u>Column 6,</u>
Line 35, "regarding" should be deleted.

<u>Column 9,</u>
Line 7, "out side" should read -- outside --.

<u>Column 10,</u>
Line 65, delete "processing." should read -- processing. ¶ The image processing unit 405 subjects the digital image information from the photographing unit to the density-converting processing in accordance with the generated density-converting curve, and outputs the processed infomation. --.

<u>Column 12,</u>
Line 62, ""System Inc."" should read -- "System in1" --; and
Line 63, "Inc."" should read -- in1" --

<u>Column 13,</u>
Line 4, "Ox1OFF8" should read -- 0x1OFF8 --; and
Line 5, "Ox1OFF" should read -- 0x1FFF --.

<u>Column 16,</u>
Line 4, "has" should read -- have --.

UNITED STATES PATENT AND TRADEMARK OFFICE
CERTIFICATE OF CORRECTION

PATENT NO. : 6,789,087 B1
DATED : September 7, 2004
INVENTOR(S) : Tsukasa Sako

It is certified that error appears in the above-identified patent and that said Letters Patent is hereby corrected as shown below:

<u>Column 19,</u>
Line 7, "unit," should read -- unit, a --.

Signed and Sealed this

Twenty-second Day of March, 2005

JON W. DUDAS
*Director of the United States Patent and Trademark Office*